United States Patent [19]

Kammerer et al.

[11] Patent Number: 4,545,049
[45] Date of Patent: Oct. 1, 1985

[54] PRIVATE BRANCH EXCHANGE HAVING TRANSMISSION CHANNELS COMMONLY AVAILABLE TO ALL STATIONS

[75] Inventors: Walter Kammerer, Nürnberg; Vladimir Spiro, Eckental, both of Fed. Rep. of Germany

[73] Assignee: U.S. Philips Corporation, New York, N.Y.

[21] Appl. No.: 552,993

[22] Filed: Nov. 17, 1983

[30] Foreign Application Priority Data

Nov. 20, 1982 [DE] Fed. Rep. of Germany ....... 3242958

[51] Int. Cl.⁴ .......................... H04J 3/14; H04Q 11/04
[52] U.S. Cl. ........................................ 370/16; 370/67; 370/87; 340/825.01
[58] Field of Search ....................... 370/16, 67, 87, 88; 340/825.01

[56] References Cited

U.S. PATENT DOCUMENTS

| | | |
|---|---|---|
| 4,061,880 | 12/1977 | Collins et al. .......................... 370/67 |
| 4,076,961 | 2/1978 | Holsinger et al. .............. 340/825.01 |
| 4,288,870 | 9/1981 | McDonald et al. .................. 370/67 |
| 4,365,247 | 12/1982 | Bargston et al. .............. 340/825.01 |
| 4,393,493 | 7/1983 | Edwards ......................... 340/825.01 |
| 4,442,518 | 4/1984 | Morimoto ............................. 370/16 |
| 4,463,350 | 7/1984 | Kajiura et al. ................. 340/825.01 |

Primary Examiner—Douglas W. Olms
Assistant Examiner—Curtis Kuntz
Attorney, Agent, or Firm—Thomas A. Briody; William J. Streeter; Leroy Eason

[57] ABSTRACT

A private branch exchange circuit in which information is transmitted between a plurality of subscriber stations in time division multiplex sequence over a plurality of data lines and control lines, one group of lines being for the transmission direction and a corresponding group for the reception direction, and all lines being commonly available to all stations. Pairs of oppositely directed lines are connected to complete a loop which includes a central control circuit which allocates the lines and time division time slots therein among all stations, and in the event of failure of any line re-allocates the stations to other lines.

5 Claims, 1 Drawing Figure

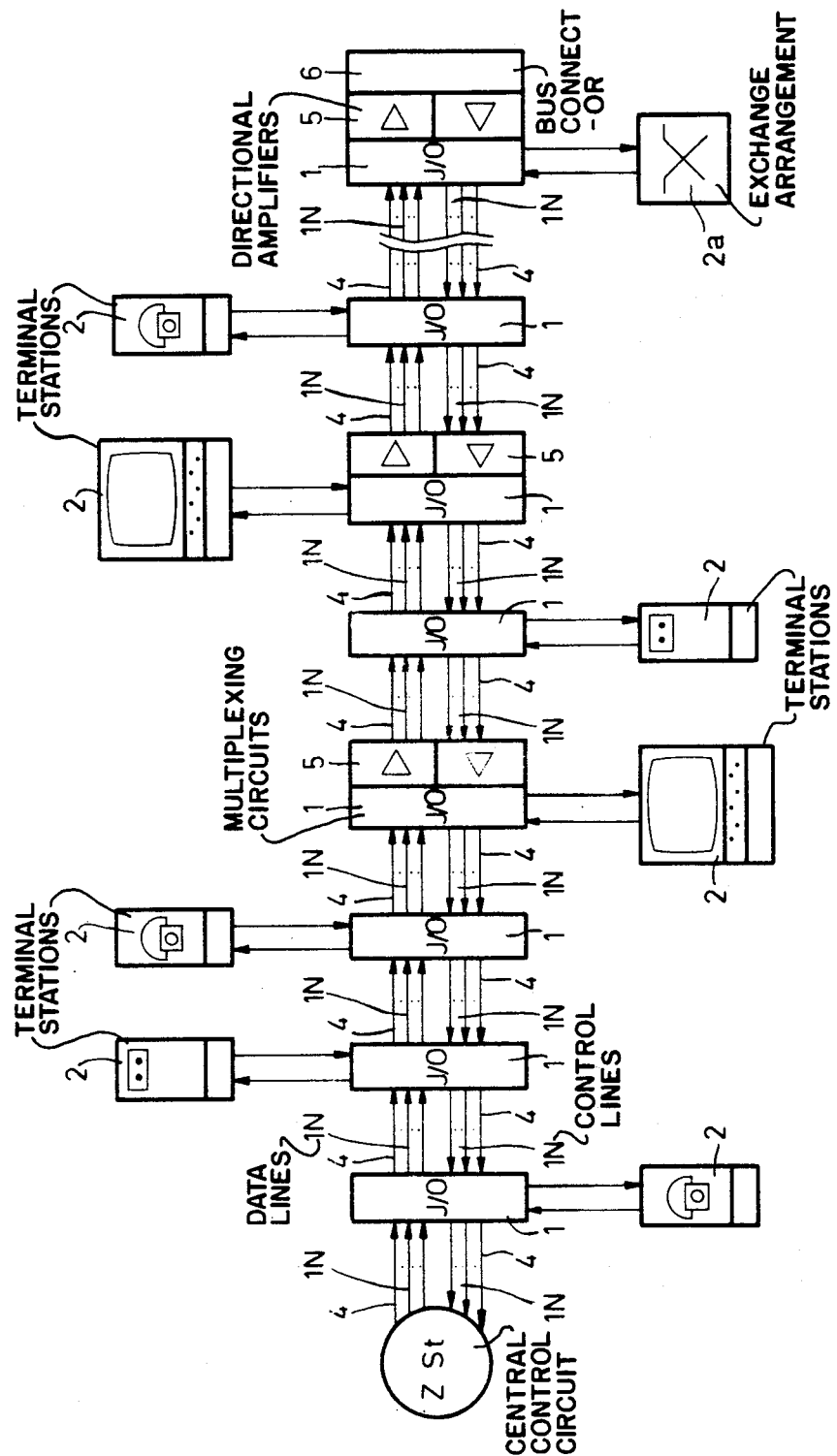

PRIVATE BRANCH EXCHANGE HAVING TRANSMISSION CHANNELS COMMONLY AVAILABLE TO ALL STATIONS

BACKGROUND OF THE INVENTION

1. Field of the Invention

The invention relates to a centrally controlled telephone exchange, more specifically a private branch exchange comprising a plurality of subscriber terminal stations and directional data lines, to which all the subscriber terminal stations are connected in parallel and via which data blocks are serially transmitted.

2. Description of the Related Art

WO No. 80/00883 disclose a data system controlled in accordance with the time-division multiplex principle. This data system comprises a plurality of data processing units connected to a central control. The data processing units each comprise a transmitter and a receiver. Each transmitter and each receiver are connected to a single bus line. Amplifiers can be provided in each of these bus lines (directional data line), as a result of which very long bus lines can be employed.

Via one bus line data blocks are serially transmitted from a transmitting data processing unit to the central control. After processing in the central control the information to be exchanged between the data processing units is transmitted in the form of serial data blocks via the second bus line to the addressed data processing unit.

In this data system (WO No. 80/00883=P No. 29 53 239.6) control signals and information (data) are jointly transmitted via a bus line. The closed loop between two information-exchanging data processing units is always conveyed via the central control. For the determination of the conditions as regards time for the control the occurrence of longer time delays caused by long bus lines and a response time determined by a fixed instruction programme in the central control must be taken into account. This predetermined, unchanging overall time delay and the dead time determined thereby reduces the total capacity of the duplex transmission channel formed by the two bus lines and renders an undelayed flow of information impossible.

If, for example analog speech signals (information) are converted into digital signals in subscriber terminal stations and these digital signals are transmitted in such a data system, the delay caused by the processing operation can be long. This delay may become manifest as an echo, that is to say as interference noise. A further disadvantage is that when central control fails, for example in the event of an interruption in one of the two lines no communication is possible any more between the data processing units. This failure results in failure of the whole data system. The probability that this occurs, is called the failure probability.

SUMMARY OF THE INVENTION

The invention has for its object to provide at low cost and with little design effort a private branch exchange for data and/or telephone communication with a low failure probability.

According to the invention, this object is accomplished in that a plurality of parallel-arranged, directional data lines, and directional control lines provide transmission paths to which each subscriber station has access, the directional lines being connected pair-wise to form a loop which includes a central control circuit.

In the event of failure of one of the lines in the transmission paths formed by the data lines and the control lines, the central control circuit selects one of the remaining lines in the transmission paths as a substitute line and switches transmission to such substitute line.

In such a multiple access system, that is to say in which each transmission path is independent of the other, the subscriber terminal stations can access a plurality of data lines in the receive and transmit directions in a fixed time-division multiplex sequence. Subscriber terminal stations transmit in the time slot assigned to them by the central control circuit via the data lines assigned to them in the transmit direction.

Because of the separation of data and control lines between a transmit direction and a receive direction, low-priced simplex amplifiers can be used. Directional data lines in the transmit direction are looped at their ends immediately into the data lines in the receive direction, that is to say without a time delay of the information. As a result thereof the time required for telephone connection is minimized (without the occurrence of interference noise, for example echoes).

If the private branch exchange must be extended, the looped end connections constitute a readily accessible place at which, after splitting of the loop connections to a further private branch exchange can be made, or lengthening the directional lines for data and clock pulses is rendered possible.

A connection between two subscribers only utilizes one out of the plurality of data lines of the receive and transmit directions. Consequently, according to the invention, the private branch exchange has the advantage that when a data line in the transmit and receive direction fails, for example due to an interruption of the line, existing connections to other lines are not disturbed, that furthermore new connections can be made via the undisturbed lines and that an existing station connection can be maintained by an intact data line of the transmit and receive directions. In contrast with such a serial data transmission system in a parallel data transmission system the failure of a single data line to any station results in a complete failure of the system. All the existing connections are interrupted and no new connections can be built up.

According to an advantageous embodiment of the invention, the central control circuit transmits via at least one of the directional control lines a bit clock pulse and a frame clock pulse to each of the subscriber terminal stations.

Because of the fact that for the transmission of control information lines are used which are separate from the data lines used for the actual transmission of the information, failure of data lines does not affect the control programme.

BRIEF DESCRIPTION OF THE DRAWING

The invention will now be described in greater detail with reference to the embodiment shown in the sole accompanying circuit drawing of a private branch exchange of the kind in which analog speech signals are transmitted by conversion into digital signals.

DESCRIPTION OF THE PREFERRED EMBODIMENT

In the private branch exchange shown in the drawing, a plurality of subscriber stations 2 are connected to a central control circuit 3. The subscriber interface system is characterized by a, line structure, that is to say one single bus, which carries all the information and via which all the subscriber terminal stations 2 transmit and receive, and which runs through the whole private branch exchange. This bus comprises, for example, a plurality of parallel-arranged directional data lines 1N, directional control lines 4 for the transmission of bit clock pulses and frame clock pulses and directional control lines, for example for the transmission of signaling information. The private branch exchange can be used for the transmission of speech, data as well as text.

Since a single bus runs through the whole private branch exchange, amplifiers are required to drive the connected receivers. Preferably, directional amplifiers 5 are used, the bus being divided into lines of the transmit and receive directions. All the subscriber stations 2 transmit and receive via the directional data lines 1N. The end of each data line 1N of the transmit direction is connected to the beginning of the associated data line 1N in the receive direction via a bus connector 6. The bus interconnects the central control circuit 3 each of the subscriber stations 2, forming a loop. Because of the amplifiers 5 the length of the loop may be chosen optionally. The total flow of information from and to all the subscriber stations 2 is present in the region of the bus connector 6. In that region the private branch exchange can be extended by the connection of further central control circuits.

In the central control 3 the traffic to the time slot channels is managed centrally and bit and frame clock pulses for synchronizing the time-division multiplex transmission are generated. In addition, time division multiplexers 1 are provided, which comprise circuit portions for the connection of one or more subscriber stations 2 or for the transition to further exchange arrangements 2a, circuit portions for access to the lines of the buses and circuit portions for conveying connection requests from stations 2 to the central control circuit 3. Multiplexers 1 enable each subscriber station 2 to feed data in any time slot of any of data lines 1N and take data from there. The multiplexers 1 may be of different constructions according to their function. These functions are, for example, internal telephone calls, external telephone calls, data storage exchange, data-line exchange, processing higher protocol levels, and disc-controlled storage of transmitted data. In a specific embodiment of the bus 6 it comprised the following lines:

(a) a control line for transmitting the 2.048 MHz bit clock pulses.
(b) a control line for transmitting the 8 KHz frame clock pulses in the transmit and receive directions,
(c) eight data lines 1N for transmitting data in each of the transmit and receive directions at a bit rate of 2.048 Mbit/s,
(d) and also a control line for transmitting signaling information in the transmit and receive directions at a bit rate of, for example, 500 kBit/s.

The data are transmitted serially in data blocks of eight bits each, and in time-division multiplex sequence, that is to say that, for example, 32 time channels of eight bit each are transmitted at a bit rate of 64 kBit/s via each of the eight parallel data lines 1N. There are, therefore, a total of $32 \times 8 = 256$ time slot channels. If the flow of information from a subscriber station 2 has a lower bit rate then the time channel for that station is completed with filler bits. At higher bit rates several time channels are assigned to a subscriber station 2 by the central control circuit 3. The total transmission capacity of the above-described embodiment is approximately $256 \times 64k$ Bit/s = 16 MBit/s and 256 subscriber stations can be connected substantially congestion-free.

Preferably, all the directional control lines 4 for the transmission of the bit clock pulses, the frame clock pulses and the signaling information, as well as the data lines 1N, comprise directional amplifiers. The time-division multiplex frame pulses are conveyed at the bit rate via the bus 6, and {the frame clock pulses }<can be taken at>(the instant of the time slot channel 0), separately for the transmit and receive directions. Connection requests from the subscriber stations 2 are conveyed to the central control circuit 3 via the control lines 4 for signalling purposes, and the central control circuit establishes the station connection by assigning free time channels. In addition to the interrogation by the multiplexers 1 in response to connecting requests from the subscriber terminal stations 2, the protocol on the control lines 4 is evaluated in the central control circuit 3 for signalling purposes. Additional functions of the central control circuit 3 are the storage of central exchange data of the private branch exchanges, the allocation of free time channels, to carry statistics, to monitor each line of the bus and additional arrangements for generating dialling tones, the evaluation of multi-frequency dialling of the subscriber stations 2 and establishing conference connections between the subscriber stations 2.

When failure of one of the eight data lines 1N of the receive direction and the transmit direction is recognized by the central control circuit 3, it does not allocate time channels to the disturbed line. The establishment of the connection for traffic between the subscriber stations 2 then is effected via the remaining data lines 1N in the receive and the transmit directions. In order to increase the operational reliability of the private branch exchange dual central control circuits 3 and dual control lines 4 may be provided for signalling purposes may be of a dual construction.

What is claimed is:
1. A telephone private branch exchange for a plurality of subscriber terminal stations (2), comprising:
   a first group of directional data lines (1N) and directional control lines (4) for transmission in a transmit direction through the exchange;
   a second group of directional data lines (1N) and directional control lines (4) for transmission in a receive direction through the exchange;
   a central control circuit (3);
   the lines in said first and second groups being connected in pairs to form respective loops including said central control circuit;
   and a plurality of multiplexing circuits (1) respectively connecting each of said terminal stations (2) to each of said loops;
   said control circuit (3) being adapted to control said multiplexing circuits (1) to allocate time division multiplex time slots on the lines in said loops among all of said terminal stations (2) so that data transmission between said terminal stations may be effected in serial blocks of data in allocated time slots over any of said data lines.

2. A telephone private branch exchange as claimed in claim 1, wherein the central control circuit (3) is further adapted to supervise the operational condition of the lines in each of said loops and in the event of failure of any line in any loop to allocate the lines in the remaining loops among all of said terminal stations (2).

3. A telephone private branch exchange as claimed in claim 2, wherein the central control circuit (3) transmits a bit clock pulse and a frame clock pulse to each of said multiplexing circuits over at least one of said directional control lines (4).

4. A telephone private branch exchange as claimed in claim 2, wherein the time division multiplex time slot allocation is effected by the central control circuit 3 by exchanging signalling information over signalling channels between said control circuit and the subscriber stations (2).

5. A telephone private branch exchange as claimed in claim 4, wherein the signalling information is conveyed within a time division multiplex time frame over control lines (4).

* * * * *